(12) United States Patent
Kang et al.

(10) Patent No.: US 11,497,016 B2
(45) Date of Patent: *Nov. 8, 2022

(54) METHOD OF DETERMINING MODULATION ORDER AND TRANSPORT BLOCK SIZE IN DOWNLINK DATA CHANNEL, AND APPARATUS THEREOF

(71) Applicant: KT CORPORATION, Gyeonggi-do (KR)

(72) Inventors: Seunghyun Kang, Seoul (KR); Woo-jin Choi, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 43 days.

This patent is subject to a terminal disclaimer.

(21) Appl. No.: 16/541,393

(22) Filed: Aug. 15, 2019

(65) Prior Publication Data
US 2020/0022141 A1    Jan. 16, 2020

Related U.S. Application Data

(63) Continuation of application No. 15/342,149, filed on Nov. 3, 2016, now Pat. No. 10,425,938.

(30) Foreign Application Priority Data

Nov. 6, 2015 (KR) .................. 10-2015-0155867
Mar. 8, 2016 (KR) .................. 10-2016-0027603

(51) Int. Cl.
*H04W 72/04* (2009.01)
*H04W 4/70* (2018.01)
(Continued)

(52) U.S. Cl.
CPC ....... *H04W 72/0446* (2013.01); *H04L 1/0003* (2013.01); *H04L 5/0064* (2013.01);
(Continued)

(58) Field of Classification Search
CPC ... H04L 1/0003; H04L 27/0008; H04L 27/20; H04L 27/362; H04L 5/0064;
(Continued)

(56) References Cited

U.S. PATENT DOCUMENTS 9,282,567 B2 * 3/2016 Golitschek Edler von Elbwart ... H04W 72/042
9,923,674 B2 * 3/2018 You .......................... H04W 4/70
(Continued)

FOREIGN PATENT DOCUMENTS

CN    101547076 A    9/2009
CN    104641675 A    5/2015
(Continued)

OTHER PUBLICATIONS

Yi, Yunjung, "Framestructure for MTC in CE Mode", Oct. 21, 2015, U.S. Appl. No. 62/244,729, Total pp. 50 (Year: 2015).*
(Continued)

*Primary Examiner* — Shah M Rahman
(74) *Attorney, Agent, or Firm* — IP Legal Services, LLC

(57) ABSTRACT

The present disclosure relates to a method and apparatus for configuring a resource for the transmission/reception of data. More particularly, the present disclosure relates to a method and apparatus for configuring an MCS and a TBS for an MTC terminal. Particularly, provided is a method and apparatus for determining a TBS by an MTC terminal. The method may include receiving scheduling information transmitted based on an MCS used for the MTC terminal and a TBS table and determining a TBS using the scheduling information provided by a base station.

12 Claims, 23 Drawing Sheets

| $I_{MCS}$ | $Q_m$ | $I_{TBS}$ |
|---|---|---|
| 0 | 2 | 0 |
| 1 | 2 | 1 |
| 2 | 2 | 2 |
| 3 | 2 | 3 |
| 4 | 2 | 4 |
| 5 | 2 | 5 |
| 6 | 2 | 6 |
| 7 | 2 | 7 |
| 8 | 2 | 8 |
| 9 | 2 | 9 |
| 10 | 4 | 10 |
| 11 | 4 | 11 |
| 12 | 4 | 12 |
| 13 | 4 | 13 |
| 14 | 4 | 14 |
| 15 | 4 | 15 |

(51) Int. Cl.
 H04L 1/00 (2006.01)
 H04L 5/00 (2006.01)
 H04L 27/00 (2006.01)
 *H04L 27/20* (2006.01)
 *H04L 27/36* (2006.01)

(52) U.S. Cl.
 CPC ........... H04L 27/0008 (2013.01); H04W 4/70 (2018.02); *H04L 27/20* (2013.01); *H04L 27/362* (2013.01); *H04W 72/042* (2013.01)

(58) Field of Classification Search
 CPC .. H04L 27/0012; H04W 4/70; H04W 72/042; H04W 72/0446
 See application file for complete search history.

(56) References Cited

U.S. PATENT DOCUMENTS

| | | | | |
|---|---|---|---|---|
| 10,485,003 | B2* | 11/2019 | Zhang | H04W 72/0493 |
| 2009/0305698 | A1* | 12/2009 | Zhang | H04L 1/1896 455/434 |
| 2010/0184489 | A1 | 7/2010 | Penther et al. | |
| 2010/0195614 | A1 | 8/2010 | Nimbalker et al. | |
| 2012/0008574 | A1 | 1/2012 | Xiao et al. | |
| 2012/0177137 | A1 | 7/2012 | Cheng et al. | |
| 2015/0036590 | A1 | 2/2015 | Lahetkangas et al. | |
| 2015/0085729 | A1 | 3/2015 | Majjigi et al. | |
| 2015/0195069 | A1 | 7/2015 | Yi et al. | |
| 2015/0237644 | A1 | 8/2015 | Golitschek Edler von Elbwart et al. | |
| 2015/0271802 | A1 | 9/2015 | Kang et al. | |
| 2015/0312082 | A1 | 10/2015 | Shin et al. | |
| 2015/0351092 | A1 | 12/2015 | Seo et al. | |
| 2015/0358193 | A1* | 12/2015 | Lorca Hernando | H04L 27/2695 370/329 |
| 2015/0365181 | A1 | 12/2015 | Nagata et al. | |
| 2015/0382328 | A1 | 12/2015 | Jiang et al. | |
| 2016/0073381 | A1* | 3/2016 | Ratasuk | H04W 4/70 370/329 |
| 2016/0087777 | A1 | 3/2016 | Ihm | |
| 2016/0100422 | A1 | 4/2016 | Papasakellariou et al. | |
| 2016/0192333 | A1 | 6/2016 | Wang et al. | |
| 2016/0218788 | A1* | 7/2016 | Yum | H04B 7/0626 |
| 2016/0269160 | A1* | 9/2016 | Noh | H04L 5/0048 |
| 2016/0270038 | A1* | 9/2016 | Papasakellariou | H04L 1/1887 |
| 2016/0285535 | A1* | 9/2016 | Kim | H04B 7/0632 |
| 2017/0111202 | A1* | 4/2017 | Kim | H04L 27/0008 |
| 2017/0163396 | A1 | 6/2017 | Blankenship | |
| 2017/0231000 | A1 | 8/2017 | Nagata et al. | |
| 2017/0311294 | A1 | 10/2017 | Kim et al. | |
| 2017/0374570 | A1* | 12/2017 | Yi | H04L 1/00 |
| 2018/0115387 | A1* | 4/2018 | Takeda | H04L 1/08 |
| 2019/0254038 | A1* | 8/2019 | Zhang | H04W 72/042 |
| 2019/0341962 | A1* | 11/2019 | Yi | H04B 1/7136 |
| 2020/0077367 | A1* | 3/2020 | Kim | H04W 52/02 |
| 2020/0213040 | A1* | 7/2020 | Takeda | H04W 74/0833 |

FOREIGN PATENT DOCUMENTS

| | | |
|---|---|---|
| CN | 104956723 A | 9/2015 |
| KR | 10-2015-0111823 A | 10/2015 |
| WO | 2014/056131 A1 | 4/2014 |

OTHER PUBLICATIONS

Ericsson et al., "WF on DCI formats for MTC", 3GPP TSG RAN WG1 Meeting #82bis, R1-156175, Malmö, Sweden, Oct. 5-9, 2015, Agenda item 7.2.1.2, Total pp. 4 (Year: 2015).*

* cited by examiner

FIG.1

| Physical channel name | PUCCH (1A) | PRACH | PUSCH | PDSCH | PBCH | SCH | PDCCH (1A) |
|---|---|---|---|---|---|---|---|
| MCL (FDD) [dB] | 147.2 | 141.7 | 140.7 | 145.4 | 149.0 | 149.3 | 146.1 |
| MCL (TDD) [dB] | 149.4 | 146.7 | 147.4 | 148.1 | 149.0 | 149.3 | 146.9 |
| NOTE 1: eNB is assumed with 2 Tx and 2 Rx in FDD systems. ||||||||
| NOTE 2: eNB is assumed with 8 Tx and 8 Rx in TDD systems. ||||||||
| NOTE 3: PHICH is neglected and the function of PHICH can be implemented by PDCCH in case of cell edge. ||||||||

FIG.2

| Physical channel name | PUCCH (1a) | PRACH | PUSCH | PDSCH | PBCH | SCH | PDCCH (1A) |
|---|---|---|---|---|---|---|---|
| Required improvement [dB] | 8.5 | 14.0 | 15.0 | 10.3 | 6.7 | 6.4 | 9.6 |

FIG.3

| MCS Index $I_{MCS}$ | Modulation Order $Q_m$ | TBS Index $I_{TBS}$ |
|---|---|---|
| 0 | 2 | 0 |
| 1 | 2 | 1 |
| 2 | 2 | 2 |
| 3 | 2 | 3 |
| 4 | 2 | 4 |
| 5 | 2 | 5 |
| 6 | 2 | 6 |
| 7 | 2 | 7 |
| 8 | 2 | 8 |
| 9 | 2 | 9 |
| 10 | 4 | 9 |
| 11 | 4 | 10 |
| 12 | 4 | 11 |
| 13 | 4 | 12 |
| 14 | 4 | 13 |
| 15 | 4 | 14 |
| 16 | 4 | 15 |
| 17 | 6 | 15 |
| 18 | 6 | 16 |
| 19 | 6 | 17 |
| 20 | 6 | 18 |
| 21 | 6 | 19 |
| 22 | 6 | 20 |
| 23 | 6 | 21 |
| 24 | 6 | 22 |
| 25 | 6 | 23 |
| 26 | 6 | 24 |
| 27 | 6 | 25 |
| 28 | 6 | 26 |
| 29 | 2 | reserved |
| 30 | 4 | |
| 31 | 6 | |

FIG.4

| CQI index | modulation | code rate x 1024 | efficiency |
|---|---|---|---|
| 0 | \multicolumn{3}{c}{out of range} | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |

FIG.6

| CQI Index | $I_{MCS}$ | $I_{TBS}$ | Code rate * 1024 | Efficiency |
|---|---|---|---|---|
| 2 | 0 | 0 | 120 | 0.2344 |
| - | 1 | 1 | 157 | 0.3057 |
| 3 | 2 | 2 | 193 | 0.3770 |
| - | 3 | 3 | 251 | 0.4893 |
| 4 | 4 | 4 | 308 | 0.6016 |
| - | 5 | 5 | 379 | 0.7393 |
| 5 | 6 | 6 | 449 | 0.8770 |
| - | 7 | 7 | 526 | 1.0264 |
| 6 | 8 | 8 | 602 | 1.1758 |
| - | 9 | 9 | 679 | 1.3262 |
| - | 10 | 9 | 340 | 1.3262 |
| 7 | 11 | 10 | 378 | 1.4766 |
| - | 12 | 11 | 434 | 1.6954 |
| 8 | 13 | 12 | 490 | 1.9141 |
| - | 14 | 13 | 553 | 2.1602 |
| 9 | 15 | 14 | 616 | 2.4063 |
| - | 16 | 15 | 658 | 2.5684 |
| - | 17 | 15 | 438 | 2.5684 |
| 10 | 18 | 16 | 466 | 2.7305 |
| - | 19 | 17 | 517 | 3.0264 |
| 11 | 20 | 18 | 567 | 3.3223 |
| - | 21 | 19 | 616 | 3.6123 |
| 12 | 22 | 20 | 666 | 3.9023 |
| - | 23 | 21 | 719 | 4.2129 |
| 13 | 24 | 22 | 772 | 4.5234 |
| - | 25 | 23 | 822 | 4.8193 |
| 14 | 26 | 24 | 873 | 5.1152 |
| - | 27 | 25 | 910 | 5.3350 |
| 15 | 28 | 26 | 948 | 5.5547 |

FIG.7

| $I_{TBS}$ | $N_{PRB}$ | | | | | |
|---|---|---|---|---|---|---|
| | 1 | 2 | 3 | 4 | 5 | 6 |
| 0 | 16 | 32 | 56 | 88 | 120 | 152 |
| 1 | 24 | 56 | 88 | 144 | 176 | 208 |
| 2 | 32 | 72 | 144 | 176 | 208 | 256 |
| 3 | 40 | 104 | 176 | 208 | 256 | 328 |
| 4 | 56 | 120 | 208 | 256 | 328 | 408 |
| 5 | 72 | 144 | 224 | 328 | 424 | 504 |
| 6 | 328 | 176 | 256 | 392 | 504 | 600 |
| 7 | 104 | 224 | 328 | 472 | 584 | 712 |
| 8 | 120 | 256 | 392 | 536 | 680 | 808 |
| 9 | 136 | 296 | 456 | 616 | 776 | 936 |
| 10 | 144 | 328 | 504 | 680 | 872 | 1032 |
| 11 | 176 | 376 | 584 | 776 | 1000 | 1192 |
| 12 | 208 | 440 | 680 | 904 | 1128 | 1352 |
| 13 | 224 | 488 | 744 | 1000 | 1256 | 1544 |
| 14 | 256 | 552 | 840 | 1128 | 1416 | 1736 |
| 15 | 280 | 600 | 904 | 1224 | 1544 | 1800 |
| 16 | 328 | 632 | 968 | 1288 | 1608 | 1928 |
| 17 | 336 | 696 | 1064 | 1416 | 1800 | 2152 |
| 18 | 376 | 776 | 1160 | 1544 | 1992 | 2344 |
| 19 | 408 | 840 | 1288 | 1736 | 2152 | 2600 |
| 20 | 440 | 904 | 1384 | 1864 | 2344 | 2792 |
| 21 | 488 | 1000 | 1480 | 1992 | 2472 | 2984 |
| 22 | 520 | 1064 | 1608 | 2152 | 2664 | 3240 |
| 23 | 552 | 1128 | 1736 | 2280 | 2856 | 3496 |
| 24 | 584 | 1192 | 1800 | 2408 | 2984 | 3624 |
| 25 | 616 | 1256 | 1864 | 2536 | 3112 | 3752 |
| 26 | 712 | 1480 | 2216 | 2984 | 3752 | 4392 |

FIG.9

| index | K | index | K | index | K | index | K | index | K | index | K |
|---|---|---|---|---|---|---|---|---|---|---|---|
| 1 | 40 | 33 | 296 | 65 | 592 | 97 | 1184 | 129 | 2368 | 161 | 4416 |
| 2 | 48 | 34 | 304 | 66 | 608 | 98 | 1216 | 130 | 2432 | 162 | 4480 |
| 3 | 56 | 35 | 312 | 67 | 624 | 99 | 1248 | 131 | 2496 | 163 | 4544 |
| 4 | 64 | 36 | 320 | 68 | 640 | 100 | 1280 | 132 | 2560 | 164 | 4608 |
| 5 | 72 | 37 | 328 | 69 | 656 | 101 | 1312 | 133 | 2624 | 165 | 4672 |
| 6 | 80 | 38 | 336 | 70 | 672 | 102 | 1344 | 134 | 2688 | 166 | 4736 |
| 7 | 88 | 39 | 344 | 71 | 688 | 103 | 1376 | 135 | 2752 | 167 | 4800 |
| 8 | 96 | 40 | 352 | 72 | 704 | 104 | 1408 | 136 | 2816 | 168 | 4864 |
| 9 | 104 | 41 | 360 | 73 | 720 | 105 | 1440 | 137 | 2880 | 169 | 4928 |
| 10 | 112 | 42 | 368 | 74 | 736 | 106 | 1472 | 138 | 2944 | 170 | 4992 |
| 11 | 120 | 43 | 376 | 75 | 752 | 107 | 1504 | 139 | 3008 | 171 | 5056 |
| 12 | 128 | 44 | 384 | 76 | 768 | 108 | 1536 | 140 | 3072 | 172 | 5120 |
| 13 | 136 | 45 | 392 | 77 | 784 | 109 | 1568 | 141 | 3136 | 173 | 5184 |
| 14 | 144 | 46 | 400 | 78 | 800 | 110 | 1600 | 142 | 3200 | 174 | 5248 |
| 15 | 152 | 47 | 408 | 79 | 816 | 111 | 1632 | 143 | 3264 | 175 | 5312 |
| 16 | 160 | 48 | 416 | 80 | 832 | 112 | 1664 | 144 | 3328 | 176 | 5376 |
| 17 | 168 | 49 | 424 | 81 | 848 | 113 | 1696 | 145 | 3392 | 177 | 5440 |
| 18 | 176 | 50 | 432 | 82 | 864 | 114 | 1728 | 146 | 3456 | 178 | 5504 |
| 19 | 184 | 51 | 440 | 83 | 880 | 115 | 1760 | 147 | 3520 | 179 | 5568 |
| 20 | 192 | 52 | 448 | 84 | 896 | 116 | 1792 | 148 | 3584 | 180 | 5632 |
| 21 | 200 | 53 | 456 | 85 | 912 | 117 | 1824 | 149 | 3648 | 181 | 5696 |
| 22 | 208 | 54 | 464 | 86 | 928 | 118 | 1856 | 150 | 3712 | 182 | 5760 |
| 23 | 216 | 55 | 472 | 87 | 944 | 119 | 1888 | 151 | 3776 | 183 | 5824 |
| 24 | 224 | 56 | 480 | 88 | 960 | 120 | 1920 | 152 | 3840 | 184 | 5888 |
| 25 | 232 | 57 | 488 | 89 | 976 | 121 | 1952 | 153 | 3904 | 185 | 5952 |
| 26 | 240 | 58 | 496 | 90 | 992 | 122 | 1984 | 154 | 3968 | 186 | 6016 |
| 27 | 248 | 59 | 504 | 91 | 1008 | 123 | 2016 | 155 | 4032 | 187 | 6080 |
| 28 | 256 | 60 | 512 | 92 | 1024 | 124 | 2048 | 156 | 4096 | 188 | 6144 |
| 29 | 264 | 61 | 528 | 93 | 1056 | 125 | 2112 | 157 | 4160 | | |
| 30 | 272 | 62 | 544 | 94 | 1088 | 126 | 2176 | 158 | 4224 | | |
| 31 | 280 | 63 | 560 | 95 | 1120 | 127 | 2240 | 159 | 4288 | | |
| 32 | 288 | 64 | 576 | 96 | 1152 | 128 | 2304 | 160 | 4352 | | |

FIG.10

| $N_{PRB}$ | # TBS entry |
|---|---|
| 1 | 16 |
| 2 | 16 |
| 3 | 16 |
| 4 | 14 |
| 5 | 12 |
| 6 | 10 |

FIG.11

| $N_{PRB}$ | Averge padding overhead |
|---|---|
| 1 | 17.80% |
| 2 | 17.20% |
| 3 | 16.35% |
| 4 | 16.68% |
| 5 | 17.31% |
| 6 | 18.17% |

FIG.12

| $I_{MCS}$ | $Q_m$ | $I_{TBS}$ |
|---|---|---|
| 0 | 2 | 0 |
| 1 | 2 | 1 |
| 2 | 2 | 2 |
| 3 | 2 | 3 |
| 4 | 2 | 4 |
| 5 | 2 | 5 |
| 6 | 2 | 6 |
| 7 | 2 | 7 |
| 8 | 2 | 8 |
| 9 | 2 | 9 |
| 10 | 4 | 10 |
| 11 | 4 | 11 |
| 12 | 4 | 12 |
| 13 | 4 | 13 |
| 14 | 4 | 14 |
| 15 | 4 | 15 |

FIG.13

| $I_{TBS}$ | $N_{PRB}$ | | | | | |
|---|---|---|---|---|---|---|
| | 1 | 2 | 3 | 4 | 5 | 6 |
| 0 | 16 | 32 | 56 | 88 | 120 | 152 |
| 1 | 24 | 56 | 88 | 144 | 176 | 208 |
| 2 | 32 | 72 | 144 | 176 | 208 | 256 |
| 3 | 40 | 104 | 176 | 208 | 256 | 328 |
| 4 | 56 | 120 | 208 | 256 | 328 | 408 |
| 5 | 72 | 144 | 224 | 328 | 424 | 504 |
| 6 | 328 | 176 | 256 | 392 | 504 | 600 |
| 7 | 104 | 224 | 328 | 472 | 584 | 712 |
| 8 | 120 | 256 | 392 | 536 | 680 | 808 |
| 9 | 136 | 296 | 456 | 616 | 776 | 936 |
| 10 | 144 | 328 | 504 | 680 | 872 | 1032 |
| 11 | 176 | 376 | 584 | 776 | 1000 | 1192 |
| 12 | 208 | 440 | 680 | 904 | 1128 | 1352 |
| 13 | 224 | 488 | 744 | 1000 | 1256 | 1544 |
| 14 | 256 | 552 | 840 | 1128 | 1416 | 1736 |
| 15 | 280 | 600 | 904 | 1224 | 1544 | 1800 |

FIG.14

| $I_{MCS}$ | $Q_m$ | $I_{TBS}$ |
|---|---|---|
| 0 | 2 | 0 |
| 1 | 2 | 2 |
| 2 | 2 | 4 |
| 3 | 2 | 6 |
| 4 | 2 | 8 |
| 5 | 4 | 10 |
| 6 | 4 | 12 |
| 7 | 4 | 14 |

FIG.15

| $I_{TBS}$ | $N_{PRB}$ | | | | | |
|---|---|---|---|---|---|---|
| | 1 | 2 | 3 | 4 | 5 | 6 |
| 0 | 16 | 32 | 56 | 88 | 120 | 152 |
| 2 | 32 | 72 | 144 | 176 | 208 | 256 |
| 4 | 56 | 120 | 208 | 256 | 328 | 408 |
| 6 | 328 | 176 | 256 | 392 | 504 | 600 |
| 8 | 120 | 256 | 392 | 536 | 680 | 808 |
| 10 | 144 | 328 | 504 | 680 | 872 | 1032 |
| 12 | 208 | 440 | 680 | 904 | 1128 | 1352 |
| 14 | 256 | 552 | 840 | 1128 | 1416 | 1736 |

FIG.16

| $I_{MCS}$ | $Q_m$ | $I_{TBS}$ |
|---|---|---|
| 0 | 2 | 1 |
| 1 | 2 | 3 |
| 2 | 2 | 5 |
| 3 | 2 | 7 |
| 4 | 2 | 9 |
| 5 | 4 | 11 |
| 6 | 4 | 13 |
| 7 | 4 | 15 |

FIG.17

| $I_{TBS}$ | $N_{PRB}$ | | | | | |
|---|---|---|---|---|---|---|
| | 1 | 2 | 3 | 4 | 5 | 6 |
| 1 | 24 | 56 | 88 | 144 | 176 | 208 |
| 3 | 40 | 104 | 176 | 208 | 256 | 328 |
| 5 | 72 | 144 | 224 | 328 | 424 | 504 |
| 7 | 104 | 224 | 328 | 472 | 584 | 712 |
| 9 | 136 | 296 | 456 | 616 | 776 | 936 |
| 11 | 176 | 376 | 584 | 776 | 1000 | 1192 |
| 13 | 224 | 488 | 744 | 1000 | 1256 | 1544 |
| 15 | 280 | 600 | 904 | 1224 | 1544 | 1800 |

FIG.18

| $I_{MCS}$ | $Q_m$ | $I_{TBS}$ |
|---|---|---|
| 0 | 2 | 0 |
| 1 | 2 | 1 |
| 2 | 2 | 2 |
| 3 | 2 | 3 |
| 4 | 2 | 4 |
| 5 | 2 | 5 |
| 6 | 2 | 6 |
| 7 | 2 | 7 |
| 8 | 2 | 8 |
| 9 | 2 | 9 |
| 10 | 2 | 10 |
| 11 | 2 | 11 |
| 12 | 2 | 12 |
| 13 | 2 | 13 |
| 14 | 2 | 14 |
| 15 | 2 | 15 |

FIG.19

| $I_{TBS}$ | TBS |
|---|---|
| 0 | 24 |
| 1 | 40 |
| 2 | 72 |
| 3 | 104 |
| 4 | 136 |
| 5 | 168 |
| 6 | 200 |
| 7 | 232 |
| 8 | 296 |
| 9 | 360 |
| 10 | 424 |
| 11 | 488 |
| 12 | 616 |
| 13 | 744 |
| 14 | 872 |
| 15 | 1000 |

FIG.20

| $I_{TBS}$ | TBS |
|---|---|
| 0 | 32 |
| 1 | 56 |
| 2 | 72 |
| 3 | 104 |
| 4 | 144 |
| 5 | 176 |
| 6 | 208 |
| 7 | 232 |
| 8 | 256 |
| 9 | 328 |
| 10 | 392 |
| 11 | 504 |
| 12 | 600 |
| 13 | 776 |
| 14 | 904 |
| 15 | 1000 |

FIG.21

| TBS | number of times that TBS is used | TBS | number of times that TBS is used |
|---|---|---|---|
| 32 | 2 | 256 | 5 |
| 56 | 3 | 328 | 6 |
| 72 | 2 | 392 | 2 |
| 88 | 2 | 504 | 3 |
| 104 | 2 | 584 | 2 |
| 120 | 3 | 600 | 2 |
| 144 | 4 | 680 | 3 |
| 176 | 5 | 776 | 2 |
| 208 | 4 | 904 | 2 |
| 224 | 3 | 1000 | 2 |

FIG.22

| $I_{MCS}$ | $Q_m$ | $I_{TBS}$ |
|---|---|---|
| 0 | 2 | 0 |
| 1 | 2 | 1 |
| 2 | 2 | 2 |
| 3 | 2 | 3 |
| 4 | 2 | 4 |
| 5 | 2 | 5 |
| 6 | 2 | 6 |
| 7 | 2 | 7 |

FIG.23

| $I_{TBS}$ | TBS |
|---|---|
| 0 | 40 |
| 1 | 144 |
| 2 | 176 |
| 3 | 256 |
| 4 | 392 |
| 5 | 504 |
| 6 | 776 |
| 7 | 1000 |

FIG.24

| $I_{TBS}$ | TBS |
|---|---|
| 0 | 56 |
| 1 | 120 |
| 2 | 176 |
| 3 | 256 |
| 4 | 328 |
| 5 | 504 |
| 6 | 680 |
| 7 | 1000 |

FIG.25

| TBS | number of times that TBS is used |
|---|---|
| 32 | 2 |
| 56 | 2 |
| 120 | 3 |
| 144 | 2 |
| 176 | 2 |
| 208 | 3 |
| 256 | 5 |
| 328 | 3 |
| 392 | 2 |
| 504 | 2 |
| 680 | 3 |

FIG.26

| $I_{TBS}$ | TBS |
|---|---|
| 0 | 104 |
| 1 | 144 |
| 2 | 176 |
| 3 | 224 |
| 4 | 328 |
| 5 | 584 |
| 6 | 776 |
| 7 | 1000 |

FIG.27

| TBS | number of times that TBS is used |
|---|---|
| 104 | 2 |
| 144 | 2 |
| 176 | 3 |
| 208 | 2 |
| 224 | 3 |
| 328 | 3 |
| 584 | 2 |
| 776 | 2 |
| 1000 | 2 |

METHOD OF DETERMINING MODULATION ORDER AND TRANSPORT BLOCK SIZE IN DOWNLINK DATA CHANNEL, AND APPARATUS THEREOF

CROSS REFERENCE TO RELATED APPLICATION

The present application is continuation application of U.S. patent application Ser. No. 15/342,149 (filed on Nov. 3, 2016), which claims priority under 35 U.S.C. § 119 to Korean Patent Application Nos. 10-2015-0155867 (filed on Nov. 6, 2015) and 10-2016-0027603 (filed on Mar. 8, 2016).

BACKGROUND

1. Field of the Disclosure

The present disclosure relates to a method and apparatus for configuring a resource for the transmission/reception of data. More particularly, the present disclosure relates to a method and apparatus for configuring an MCS and a TBS for an MTC terminal.

2. Description of the Prior Art

Modulation refers to transforming signal information (e.g., intensity, displacement, frequency, or phase) into an appropriate waveform to be appropriate for channel property of a transmission medium. In addition, digital modulation refers to transforming a digital signal (that is, a digital symbol stream) into a signal that is appropriate for a channel property. Such a digital signal transmits digital information by matching the same to one of various available signals (a signal set). As a representative digital modulation scheme that has high bandwidth efficiency, a M-ary QAM modulation scheme expressed in $2^M$ QAM, such as, QPSK(or 4QAM), 16QAM, and 64QAM are used.

Modulation methods used for downlink data transmission in a wireless communication system (e.g., long term evolution (LTE) or LTE-Advanced) are QPSK, 16QAM and 64QAM. Through the modulation methods, a base station transmits data to a terminal, and the terminal demodulates the transmitted signal so as to receive the data.

The base station selects one of the modulation methods based on a downlink channel state and reports the same to the terminal using downlink control information (DCI). The terminal determines the received DCI and executes demodulation that is appropriate for a data modulation scheme so as to receive the data.

To this end, the terminal measures the downlink channel state and transmits information on the measured channel state to the base station. Also, the base station determines modulation and coding scheme (MCS) index information that is mapped to each of QPSK, 16QAM, and 64QAM based on the information associated with the channel state and determines a transport block size (TBS).

In this instance, it may be inefficient to determine a modulation method and a TBS in the same manner as described above and to configure DCI even when a terminal uses a low data transmission rate based on channel property of the terminal that uses an LTE network.

Therefore, a modulation method and a TBS need to be set to be different based on channel property of a terminal. Also, there is a desire for a new scheme for configuring DCI based on a modulation method and a TBS, which are set to be different, and enabling a terminal to determine the same.

SUMMARY

In this background, an aspect of the present disclosure is to provide a method and apparatus for determining a modulation method and a transport block size (TBS), which are used when a downlink data channel is transmitted to a terminal that uses a low data transmission rate among terminals that use an LTE network.

Also, another aspect of the present disclosure is to provide a method and apparatus for configuring downlink control information using a modulation method and a TBS, which are set to be different based on the channel property of a terminal, and is also for determining, by the terminal, the modulation method and the TBS in the downlink data channel based on the same.

In accordance with an aspect of the present disclosure, there is provided a method of determining, by a terminal, a modulation order and a transport block size (TBS) in a downlink data channel. The method may include: receiving, from a base station, downlink control information; determining the modulation order used in the downlink data channel using i) a modulation and coding scheme (MCS) table having at least one of TBS indices set to be identical to MCS indices and ii) an MCS index included in the downlink control information; and determining a TBS index using the MCS table and the MCS index included in the downlink control information, and determining a TBS in the downlink data channel using a TBS table including TBS indices and the determined TBS index.

In accordance with another aspect of the present disclosure, there is provided a method of determining, by a base station, a modulation order and a transport block size (TBS) in a downlink data channel. The method may include: receiving channel state information from a terminal; determining an MCS index and a number of PRBs based on i) an MCS table having at least one of TBS indices set to be identical to MCS indices, ii) a TBS table including TBS indices, and iii) the channel state information; and transmitting, to the terminal, downlink control information including the determined MCS index and the number of PRBs.

In accordance with another aspect of the present disclosure, there is provided a terminal that receives data. The terminal may include a transmitting unit, a receiving unit, and a controller. The transmitting unit is configured to transmit channel state information to a base station. The receiving unit is configured to receive downlink control information from the base station. The controller is configured to: determine a modulation order used in a downlink data channel based on i) an MCS table having at least one of TBS indices set to be identical to MCS indices, and ii) an MCS index included in the downlink control information; and determine a transport block size (TBS) in the downlink data channel based on a TBS table including TBS indices, and a TBS index indicated by the MCS index included in the downlink control information.

In accordance with another aspect of the present disclosure, there is provided a base station that transmits data. The base station may include a receiving unit, a transmitting unit, and a controller. The receiving unit is configured to receive channel state information from a terminal. The transmitting unit is configured to transmit downlink control information to the terminal. The controller is configured to determine an MCS index and a number of PRBs based on i) an MCS table having at least one of TBS indices set to be identical to MCS indices, ii) a TBS table including TBS indices, and iii) channel state information; and generate downlink control information including the determined MCS index and the number of PRBs.

According to the present disclosure, there is provided a method and apparatus for determining a modulation method and a TBS in a downlink data channel for a terminal that uses an LTE network and a low data transmission rate, and for configuring downlink control information.

Also, according to the present disclosure, a configuration scheme of downlink control information is changed based on the channel property of a terminal that uses an LTE network, and thus, an unnecessary signaling overhead may be reduced when the downlink control information is transmitted to the terminal that uses a low data transmission rate.

BRIEF DESCRIPTION OF THE DRAWINGS

The above and other objects, features, and advantages of the present disclosure will be more apparent from the following detailed description taken in conjunction with the accompanying drawings, in which:

FIG. 1 is a table including Maximum Coupling Loss (MCL) values that represent a link budget of each physical channel in an LTE MTC terminal;

FIG. 2 is a table that indicates a degree of coverage improvement for each physical channel, which is required to satisfy a target MCL value listed in the table of FIG. 1;

FIG. 3 is a table illustrating a relationship among a modulation and coding scheme (MCS) index, a modulation order, and a transport block size (TBS) index;

FIG. 4 is a typical CQI index table;

FIG. 6 is a mapping table between a typical CQI index table and an MCS index and a TBS index.

FIG. 7 is a table illustrating a TBS value based on a TBS index and the number of PRBs;

FIG. 9 is a table illustrating a code block size that allows turbo-coding;

FIG. 10 is diagram table illustrating the number of TBS entries that are available when a method of determining a TBS by an MTC terminal based on scheduling information of conventional downlink control information is used;

FIG. 11 is a table illustrating an average padding overhead for each value corresponding to the number of PRBs when a method of determining a TBS by an MTC terminal based on scheduling information of conventional downlink control information is used;

FIGS. 12 and 13 are diagrams for describing a scheme that configures downlink control information in a normal coverage according to a first embodiment of the present disclosure;

FIGS. 14 and 15 are diagrams for describing a scheme that configures downlink control information in a normal coverage according to a second embodiment of the present disclosure;

FIGS. 16 and 17 are diagrams for describing a scheme that configures downlink control information in a normal coverage according to a third embodiment of the present disclosure;

FIGS. 18 to 21 are diagrams for describing a scheme that configures downlink control information in an extended coverage according to a fourth embodiment of the present disclosure;

FIGS. 22 to 27 are diagrams for describing a scheme that configures downlink control information in an extended coverage according to a fifth embodiment of the present disclosure;

DETAILED DESCRIPTION OF THE EXEMPLARY EMBODIMENTS

Figure 5:
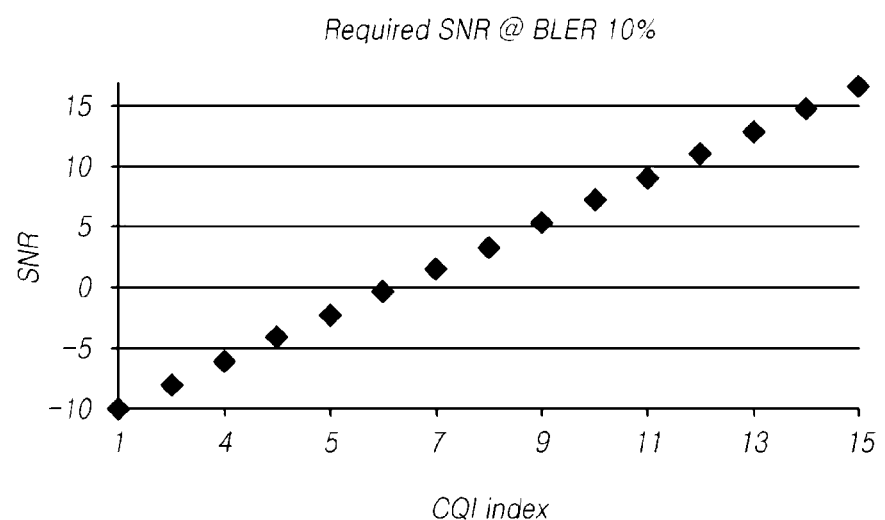
FIG. 5 is a graph illustrating CQI Block Error Rate (BLER) performance.

Hereinafter, some embodiments of the present disclosure will be described in detail with reference to the accompanying illustrative drawings. In designating elements of the drawings by reference numerals, the same elements will be designated by the same reference numerals although they are shown in different drawings. Further, in the following description of the present disclosure, a detailed description of known functions and configurations incorporated herein will be omitted when it may make the subject matter of the present disclosure rather unclear.

In addition, terms, such as first, second, A, B, (a), (b) or the like may be used herein when describing components of the present disclosure. These terms are merely used to distinguish one component from other components, and the property, order, sequence and the like of the corresponding component are not limited by the corresponding term. In the case that it is described that a certain structural element "is connected to", "is coupled to", or "is in contact with" another structural element, it should be interpreted that another structural element may "be connected to", "be coupled to", or "be in contact with" the structural elements as well as that the certain structural element is directly connected to or is in direct contact with another structural element.

In the present specifications, a machine type communication (MTC) terminal refers to a low cost or low complexity terminal, a terminal that supports coverage enhancement, or the like. Alternatively, in the present specifications, the MTC terminal refers to a terminal that is defined as a predetermined category for maintaining low costs (or low complexity) and/or coverage enhancement.

In other words, in the present specifications, the MTC terminal may refer to a newly defined 3GPP Release 13 low cost (or low complexity) UE category/type, which executes LTE-based MTC related operations. Alternatively, in the present specifications, the MTC terminal may refer to a UE category/type that is defined in or before 3GPP Release-12 that supports the enhanced coverage in comparison with the existing LTE coverage, or supports low power consumption, or may refer to a newly defined Release 13 low cost (or low complexity) UE category/type.

The wireless communication system may be widely installed so as to provide various communication services, such as a voice service, packet data, and the like.

The wireless communication system may include a User Equipment (UE) and a Base Station (BS or an eNB). Throughout the specifications, the user equipment may be an inclusive concept indicating a user terminal utilized in wireless communication, including a UE (User Equipment) in wideband code division multiple access (WCDMA), long term evolution (LTE), high speed packet access (HSPA), and the like, and an MS (Mobile station), a UT (User Terminal), an SS (Subscriber Station), a wireless device, and the like in global system for mobile communication (GSM).

A base station or a cell may generally refer to a station where communication with a User Equipment (UE) is performed. The base station or cell may also be referred to as a Node-B, an evolved Node-B (eNB), a Sector, a Site, a Base Transceiver System (BTS), an Access Point, a Relay Node, a Remote Radio Head (RRH), a Radio Unit (RU), and the like.

That is, a base station or cell may be construed as an inclusive concept indicating a portion of an area covered by a BSC (Base Station Controller) in CDMA, a NodeB in WCDMA, an eNB or a sector (site) in LTE, and the like, and the concept may include various coverage areas, such as a megacell, a macrocell, a microcell, a picocell, a femtocell, a communication range of a relay node, and the like.

Each of the above mentioned various cells has a base station that controls a corresponding cell, and thus, the base station may be construed in two ways.

i) the base station may be a device itself that provides a megacell, a macrocell, a microcell, a picocell, a femtocell, and a small cell in association with a wireless area, or ii) the base station may indicate a wireless area itself.

In i), a base station may be all devices controlled by one entity or cooperating with each other for configuring a predetermined wireless area. Based on a configuration type of a wireless area, an eNB, an remote radio head (RRH), an antenna, an radio unit (RU), a Low Power Node (LPN), a point, a transmission/reception point, a transmission point, a reception point, and the like may be embodiments of a base station.

In ii), a base station may be a wireless area itself that receives or transmits a signal from a perspective of a terminal or a neighboring base station.

Therefore, a megacell, a macrocell, a microcell, a picocell, a femtocell, a small cell, an RRH, an antenna, an RU, an LPN, a point, an eNB, a transmission/reception point, a transmission point, and a reception point are commonly referred to as a base station.

In the specification, the user equipment and the base station are used as two (uplink or downlink) inclusive transceiving subjects to embody the technology and technical concepts described in the specifications, and may not be limited to a predetermined term or word.

Here, Uplink (UL) refers to a scheme for a UE to transmit and receive data to/from a base station, and Downlink (DL) refers to a scheme for a base station to transmit and receive data to/from a UE.

Varied multiple access schemes may be unrestrictedly applied to the wireless communication system. Various multiple access schemes may include CDMA (Code Division Multiple Access), TDMA (Time Division Multiple Access), FDMA (Frequency Division Multiple Access), OFDMA (Orthogonal Frequency Division Multiple Access), OFDM-FDMA, OFDM-TDMA, OFDM-CDMA.

An embodiment of the present disclosure may be applicable to resource allocation in an asynchronous wireless communication scheme that is advanced through GSM, WCDMA, and HSPA, to be LTE and LTE-advanced. Embodiments of the present disclosure may be also applicable to resource allocation in a synchronous wireless communication scheme that is advanced through CDMA and CDMA-2000, to be UMB. Embodiments of the present disclosure may not be limited to a specific wireless communication field. Embodiments of the present disclosure may be applicable to other related technical fields.

Uplink transmission and downlink transmission may be performed based on a TDD (Time Division Duplex) scheme or an FDD (Frequency Division Duplex). The TDD scheme performs transmission based on different times. The FDD scheme performs transmission based on different frequencies.

Further, in a system such as LTE and LTE-A, a related standard may define that an uplink and a downlink are configured based on a single carrier or a pair of carriers. The uplink and the downlink may transmit control information through a control channel, such as a PDCCH (Physical Downlink Control CHannel), a PCFICH (Physical Control Format Indicator CHannel), a PITCH (Physical Hybrid ARQ Indicator CHannel), a PUCCH (Physical Uplink Control CHannel), an EPDCCH (Enhanced Physical Downlink Control CHannel), and the like. The uplink and the downlink may transmit data through a data channel, such as a PDSCH (Physical Downlink Shared CHannel), a PUSCH (Physical Uplink Shared CHannel), and the like.

Control information may be transmitted using an EPDCCH (enhanced PDCCH or extended PDCCH).

In the present specification, a cell may refer to the coverage of a signal transmitted from a transmission/reception point, a component carrier having the coverage of the signal transmitted from the transmission/reception point (transmission point or transmission/reception point), or the transmission/reception point itself.

A wireless communication system according to embodiments refers to a Coordinated Multi-point transmission/reception (CoMP) system, a coordinated multi-antenna transmission system, or a coordinated multi-cell communication system, where two or more transmission/reception points cooperatively transmit a signal. A CoMP system may include at least two multi-transmission/reception points and terminals.

A multi-transmission/reception point may be a base station, a macro cell (hereinafter, referred to as an 'eNB'), or at least one RRH. The RRH is connected to the eNB through an optical cable or an optical fiber, is wiredly controlled, and has a high transmission power or a low transmission power within a macro cell area.

Hereinafter, a downlink refers to communication or a communication path from a multi-transmission/reception point to a terminal, and an uplink refers to communication or a communication path from a terminal to a multi-transmission/reception point. In a downlink, a transmitter may be a part of a multiple transmission/reception point and a receiver may be a part of a terminal. In an uplink, a transmitter may be a part of a terminal and a receiver may be a part of a multiple transmission/reception point.

Hereinafter, the situation in which a signal is transmitted and received through a PUCCH, a PUSCH, a PDCCH, an EPDCCH, a PDSCH, or the like may be described through the expression, "a PUCCH, a PUSCH, a PDCCH, an EPDCCH, or a PDSCH is transmitted or received".

In addition, hereinafter, the expression "a PDCCH is transmitted or received, or a signal is transmitted or received through a PDCCH" includes "an EPDCCH is transmitted or received, or a signal is transmitted or received through an EPDCCH".

That is, a physical downlink control channel used herein may indicate a PDCCH or an EPDCCH. Alternatively, the physical downlink control channel may indicate both a PDCCH and an EPDCCH.

In addition, for ease of description, an EPDCCH, which corresponds to an embodiment of the present disclosure, may be applied to the part described using a PDCCH and to the part described using an EPDCCH.

Meanwhile, higher layer signaling includes an RRC signaling that transmits RRC information including an RRC parameter.

An eNB performs downlink transmission to terminals. The eNB may transmit a Physical Downlink Shared Channel (PDSCH) which is a primary physical channel for unicast transmission. The eNB may transmit a Physical Downlink Control Channel (PDCCH) for transmitting downlink control information, such as scheduling required for reception of a PDSCH, and scheduling grant information for transmission of an uplink data channel (for example, a Physical Uplink Shared Channel (PUSCH)). Hereinafter, transmission and reception of a signal through each channel will be described as transmission and reception of a corresponding channel.

A machine type communication (MTC) is defined as communication between devices or objects without human intervention. From the perspective of 3GPP, "machine" indicates an entity that does not require a user's direct operation or intervention, and "MTC" is defined as a type of data communication including one or more machines.

A representative example of the machine may include a smart meter, vending machine, or the like, which is equipped with a mobile communication module. However, as a smart phone has been introduced that automatically accesses a network and executes communication without user's operation or intervention based on the location or situation of a user, a portable terminal having an MTC function has been considered as a type of machine.

[LTE-Based Low-Cost MTC]

As an LTE network has been widely used, mobile carriers desire to minimize the number of radio access terminals (RATs) in order to reduce maintenance costs of the network or the like. However, the number of typical GSM/GPRS network-based MTC products has been increasing, and an MTC that uses a low data transmission rate can be provided at a low cost. Therefore, the LTE network is used for a general data transmission, and the GSM/GPRS network is used for MTC, and thus, the mobile carriers need to separately operate two RATs, and this may cause inefficiency in utilizing a frequency band, which carries a financial burden to the mobile carriers.

To solve the above drawback, a cheap MTC terminal that uses the GSM/EGPRS network needs to be replaced with an MTC terminal that uses an LTE network. To this end, various requirements to decrease the price of the LTE MTC terminal have been discussed in the 3GPP RAN WG1 standards conference. Also, the standards conference writes a technical document (TR 36.888) including various functions that may be provided to satisfy the requirements.

A main item that is associated with changing a physical layer standard and is currently discussed in 3GPP to support the low-cost LTE MTC terminal may be a technology for supporting a narrow band/single RF chain/half duplex FDD/long discontinued reception (DRX), or the like. However, the methods that are considered to decrease the price may decrease the performance of an MTC terminal when compared to a legacy LTE terminal.

Also, about 20% of the MTC terminals that support an MTC service, such as smart metering, are installed in a deep indoor environment (e.g., a basement). To perform successful MTC data transmission, the coverage of an LTE MTC terminal needs to be improved by about 15 [dB] when compared to the coverage of a legacy normal LTE terminal.

FIG. 1 is a table including maximum coupling loss (MCL) values each representing a link budget of each physical channel in an LTE MTC terminal. An FDD PUSCH has the smallest MCL value, and thus, a target MCL value for an improvement of about 15 [dB] is 140.7+15=155.7 [dB].

FIG. 2 is a table including a degree of coverage improvement for each physical channel, which is required to satisfy a target MCL value listed in the table of FIG. 1.

To lower the price of an LTE MTC terminal and to increase the coverage, various methods for a robust transmission, such as PSD boosting, low coding rate, and time domain repetition, or the like, are considered for each physical channel.

The requirements of an LTE-based low-cost MTC terminal are as follows:

A data transmission speed should satisfy at least a data transmission speed provided by an EGPRS-based MTC terminal, that is, downlink 118.4 kbps, uplink 59.2 kbps.

Frequency efficiency should be dramatically improved when compared to a GSM/EGPRS MTC terminal.

A provided service area should not be smaller than that of a GSM/EGPRS MTC terminal.

An amount of power consumption should not be larger than a GSM/EGPRS MTC terminal.

A legacy LTE terminal and an LTE MTC terminal can be used in the same frequency.

An existing LTE/SAE network is reused.

Optimization is performed in a TDD mode, in addition to an FDD mode.

A low-cost LTE MTC terminal should support a limited mobility and a low-power consumed module.

A modulation method used for downlink data transmission in 3GPP LTE includes QPSK, 16QAM, and 64QAM. A base station selects one of the three modulation methods based on a downlink channel state, and reports the same to the terminal using Downlink Control Information (DCI).

FIG. 3 is a table showing a relationship between an MCS index formed of 5 bits, a modulation order, and a TBS index.

Referring to FIG. 3, the MCS index formed of 5 bits in downlink control information (DCI) may inform a terminal of three types of modulation methods. In FIG. 3, MCS indices from 0 to 28 are used for hybrid automatic repeat request (HARQ) initial transmission, and MCS indices 29 to 31 are used for HARQ retransmission.

More specifically, MCS indices #0 to #9 imply that a QPSK modulation method is used for DL data transmission, MCS indices #10 to #16 imply that a 16QAM modulation method is used therefor, and MCS indices #17 to #28 imply that a 64QAM modulation method is used therefor.

As described above, a plurality of MCS indices exists for an identical modulation scheme, and each MSC index indicates that data may be transmitted using code words having different coding rates. When a channel state is good, a base station uses a high MCS index to increase bandwidth efficiency, and when the channel state is poor, the base station uses a low MCS index and executes robust transmission so as to overcome the channel state. A method of adjusting an MCS to be appropriate for the channel state is referred to as link adaptation.

When the MCS indices from 0 to 28 are used for HARQ initial transmission, the MCS indices 29, 30, and 31 are used for distinguishing a modulation scheme used for HARQ retransmission. Therefore, the MCS index 29 indicates that the QPSK modulation is used for HARQ retransmission, the MCS index 30 indicates that the 16QAM modulation is used for HARQ retransmission, and the MCS index 31 indicates that the 64QAM modulation is used for HARQ retransmission.

A terminal needs to feed a channel state back to a base station so that the base station performs link adaptation based on the channel state of the terminal. Channel state information that the terminal feeds back to the base station is referred to as channel state information (CSI), and the CSI includes a pre-coding matrix indicator (PMI), a rank indicator (RI), and a channel quality indicator (CQI).

Here, the PMI and the RI is channel state information associated with a MIMO transmission. The CQI indicates a modulation method, a code rate, and a transmission efficiency (Efficiency=modulation order*code rate) that may be used based on the channel state of a terminal, as illustrated in FIG. 4. The terminal feeds back a CQI index of high transmission efficiency when the channel state is good. The terminal feeds back a CQI index of low transmission efficiency when the channel state is poor. The size of typical CQI feedback information is 4 bits and indicates a total of 16 types of transmission efficiencies.

FIG. 5 is a graph showing a CQI BLER performance. The graph of FIG. 5 includes SNR values that satisfy BLER 10% as compared to transmission efficiency and illustrates performance of a CQI of FIG. 4 in an experimental environment that simulates an AWGN channel environment having a single transmission antenna and two reception antennas.

Referring to FIG. 5, in the case of the typical CQI, the required SNR of BLER 10% ranges from about −10 dB to 17 dB. Each CQI index has a transmission efficiency that is set to have regular SNR intervals of about 1.9 dB.

A base station determines a CQI received from a terminal and determines an amount of resources to be allocated to the terminal and an MCS to be used for transmission, based on the received CQI. In this instance, the MCS of FIG. 3 and the CQI of FIG. 4 have a relationship of FIG. 6.

MCS indices 0, 2, 4, 6, 8, 11, 13, 15, 18, 20, 22, 24, 26, and 28 are set to have transmission efficiencies that are identical to the transmission efficiencies of the CQI indices 2, 3, 4, 5, 6, 7, 8, 9, 10, 11, 12, 13, 14, and 15, respectively. In addition, between two consecutive CQI indices, an MCS index is set that has a transmission efficiency corresponding to an intermediate between transmission efficiencies supported by the two CQI indices.

The MCS indices 9 and 10, of which a modulation order is changed from 2 to 4 (from QPSK to 16QAM), are set to have the same transmission efficiency. Also, the MCS indices 16 and 17, of which a modulation order is changed from 4 to 6 (from 16QAM to 64QAM), are set to have the same transmission efficiency. In addition, MCS indices having different modulation orders are set to have an identical TBS index, and thus, the same amount of TBS is transmitted through the same amount of transmission resource.

In FIG. 3, a TBS index $I_{TBS}$ is set for each MCS index $I_{MCS}$. In 3GPP TS 36.213, by taking into consideration that the number of PRB pairs ($N_{PRB}$) that ranges from 1 to 110, which corresponds to the size of a transmission resource, is allocated to a terminal, 110 TBSs corresponding to transmittable information bit sizes are defined for each $I_{TBS}$.

FIG. 7 is a table illustrating TBS values used when an $N_{PRB}$ value is 1 to 6.

The base station determines a channel state through a CQI received from a terminal and selects the size of a transmission resource to be allocated to the terminal and an MCS to be used for the corresponding transmission resource, based on the determined channel state. In this instance, determining a code rate of an MCS is equal to determining a TBS, which is a size of information bits to be transmitted through the corresponding transmission resource.

Therefore, to inform the terminal of a TBS, the base station uses the number of PRB pairs and an MCS index formed of 5 bits, which are included in scheduling information of downlink control information (DCI).

For example, when the scheduling information included in the DCI indicates that the number of PRB pairs $N_{PRB}$=4 and the MCS index $I_{MCS}$=7, it indicates that a TBS entry corresponding to the TBS index $I_{TBS}$=7 is TBS=472.

Figure 8:
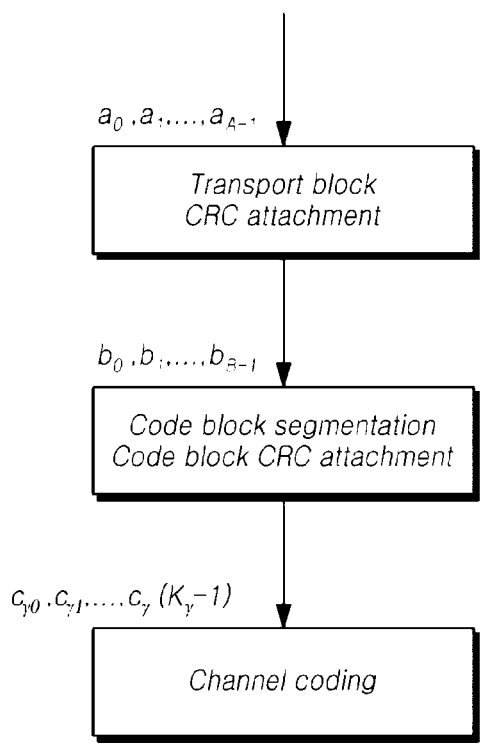
FIG. 8 is a diagram illustrating a coding method of a data channel.

FIG. 8 illustrates a method of encoding an LTE data channel. Referring to FIG. 8, a method of encoding a channel based on a set TBS will be described.

Referring to FIG. 8, when a TBS is set, a base station cuts a single MAC PDU based on a TBS or generates a transport block (TB) by aggregating a plurality of MAC PDUs based on a TBS.

Before inputting the same into a channel encoder, the method generates a TB CRC formed of 24 bits using a TB, as illustrated in FIG. 8. The method attaches the generated TB CRC to the end of a TB bit stream. When the sum of the size of the TB and the TB CRC formed of 24 bits is greater than 6144 bits, code block segmentation is executed. In this instance, a code block (CB) CRC formed of 24 bits is added to each code block, and the size of a code block including the CB CRC is not greater than 6144 bits. Each code block is encoded into a turbo code.

When the code block segmentation is executed on a TB, B, which determines the number C of code blocks, is a value including a TBS and a TB CRC. Therefore, B=A+24. In FIG. 8, an information bit stream including the TB CRC is expressed by $b_0, b_1, \ldots,$ and $b_{B-1}$.

When B is less than or equal to 6144 bits, which is the largest size of a code block, the number C of code blocks is 1, and the code block segmentation of a TB is not executed. In addition, the number C of code blocks is 1, and thus, an additional CB CRC is not required. Therefore, the total number B' of information bits that are turbo-encoded is equal to B. When B is greater than 6144 bits, the code block segmentation of a TB is executed, and the number C of code blocks is C=[B/(Z−L)]. In addition, a CB CRC formed of 24 bits is included in each code block. Therefore, the total number B' of information bits that are encoded is B'=B+24*C.

The code block segmentation method defines the number C of code blocks based on B' and determines a code block size K, which allows turbo-encoding.

FIG. 9 is a table that illustrates a code block size K that allows turbo-encoding. K uses 188 block sizes that are defined in advance in the range of 40 to 6144 bits (3GPP TS 36.212, Table 5.1.3-3: K is defined in Turbo code internal interleaver parameters).

A base station is capable of performing resource allocation of a maximum of 6 PRB pairs in a single subframe with respect to an MTC terminal, and the maximum available TBS is 1000 bits. Also, only QPSK and 16 QAM are used as a data modulation method, and 64 QAM is not used.

Therefore, when the base station informs an MTC terminal of a TBS based on a typical method, the typical TBS table may include TBS entries that are not used. Particularly, a TBS entry having an $I_{TBS}$ that is greater than or equal to 16 corresponds to the TBS entry that uses 64QAM and thus, the TBS entry is not used. Also, when $N_{PRB}$ is 4, 5, and 6, and $I_{TBS}$ is 14, 12, and 10 or higher, respectively, a TBS is greater than 1000 bits and thus, a corresponding TBS entry is not used.

FIG. 10 is a table that illustrates the number of available TBS entries when an MTC terminal determines a TBS based on the typical scheduling information, which illustrates the number of available TBS entries when $N_{PRB}$ ranges from 1 to 6.

Therefore, in the typical DCI scheduling information, the number of TBS entries that the MTC terminal may determine is relatively smaller than 5-bit MCS signaling, and thus, unnecessary signaling overhead may exist. Also, only the limited number of TBSs among TBS values ranges from at least 16 bits to a maximum of 1000 bits are defined for each $N_{PRB}$, and thus, a TBS value that can be selected during scheduling may be limited.

For example, in consideration of an MTC application that transmits a relatively small data packet size is considered, a difference between a TBS and an adjacent sized TBS is set to be large, and thus, a padding overhead increases when a MAC PDU is generated.

FIG. 11 is a table that illustrates a result of calculating average padding overhead for each $N_{PRB}$ when a value obtained by dividing the difference between two TBSs corresponding to consecutive $I_{TBS}$ with respect to TBSs defined for each $N_{PRB}$ by a large TBS value out of the two TBSs, is defined as a padding overhead.

Also, in a case of an MTC terminal of which the coverage is extended, an MCS index included in the typical scheduling information is transmitted with significantly low spectral efficiency using repetitive transmission, irrespective of a spectral efficiency used for the actual transmission. However, when a TBS value is determined based on $N_{PRB}$, the number of PRB pairs allocated for each subframe needs to be limited to determine a predetermined TBS value.

For example, to use TBS=16, the number of PRB pairs that is allocated for each subframe needs to always be one. Therefore, repetitive transmission is performed using only 1 PRB pair for each subframe. Alternatively, when the number of PRB pairs transmitted for each subframe is fixed or a separate signaling is used, an additional signaling overhead for $N_{PRB}$ is required to determine a TBS value.

Scheduling information for a TBS value is included in DCI as MCS and PRB allocation information, and the scheduling information may be transmitted to a terminal. In this instance, the used DCI is defined according to the number of repetitive transmissions based on the coverage level of an MTC terminal, as follows:

DCI format used for scheduling PDSCH for no and small repetition levels. (=DCI format M1A)
DCI format used for scheduling PDSCH for other repetition levels. (=DCI format M1B)
DCI format used for scheduling PUSCH for no and small repetition levels. (=DCI format M0A)
DCI format used for scheduling PUSCH for other repetition levels. (=DCI format M0B)

According to an example, a case in which the number of repetitive transmissions is less than or equal to 2 is referred to as no and small repetition levels, and a case in which the number of repetitive transmissions is greater than 2 is referred to as other repetition levels. However, the present disclosure may not be limited thereto.

Using a DCI format that is different based on the coverage level of an MTC terminal, a base station transmits the scheduling information to the terminal.

When the coverage of the MTC terminal corresponds to the coverage level of a legacy normal LTE terminal, the repetitive transmission of a physical channel may not be needed or a fewer number of repetitive transmissions may be needed to perform the physical channel transmission between the base station and the terminal. The base station transmits scheduling information of the physical channel to an MTC terminal using a DCI format M1A/M0A. In this instance, the used MCS information informs the terminal of a modulation method, such as QPSK or 16QAM.

When an MTC terminal is located in the coverage that is extended to be larger than the coverage level of a normal terminal, the base station transmits scheduling information of a physical channel to the MTC terminal using DCI format M1B/M0B. In this instance, the MCS information informs the terminal of only QPSK modulation method.

The present disclosure proposes to define and use MCS tables to be used for DCI format M1A/M0A or DCI format M1B/M0B, respectively.

Also, the present disclosure proposes a method of determining a TBS using scheduling information and the typical TBS table, in the case of DCI format M1A/M0A. In the case of DCI format M1B/M0B, the present disclosure proposes a method that defines a new TBS table to be used for an MTC terminal, and determines a TBS using the scheduling information of DCI format M1B/M0B.

[Method of Configuring MCS for DCI Format M1A/M0A]

First Embodiment

FIG. 12 and FIG. 13 illustrate a scheme of configuring downlink control information (DCI) that is transmitted to an MTC terminal of a normal coverage according to a first embodiment of the present disclosure. FIG. 12 is a table illustrating a relationship among an MCS index, a modulation order, and a TBS index. FIG. 13 is a table illustrating a TBS based on a TBS index and the number of PRB pairs.

FIG. 12 is an MCS table for an MTC terminal when 4 bits are used as the number of signaling bits required for an MCS information transmission of DCI format M1A/M0A.

When compared to the typical MCS table, the MCS table includes $I_{TBS}=15$, which is the largest index among 16QAM MCS entries, and the MCS table is designed to use only QPSK with respect to $I_{TBS}=9$, which is a TBS index after which QPSK is changed to 16QAM. Therefore, QPSK is used when the MCS index $I_{MCS}$ ranges from 0 to 9, and 16QAM is used when the MCS index $I_{MCS}$ ranges from 10 to 15. Also, $I_{TBS}$ and $I_{MCS}$ are designed to have the same value.

FIG. 13 illustrates a TBS value that an MTC terminal uses in the typical TBS table when the MCS table of FIG. 12 is used.

Second Embodiment

FIG. 14 and FIG. 15 illustrate a scheme of configuring downlink control information (DCI) that is transmitted to an MTC terminal in a normal coverage according to a second embodiment of the present disclosure. FIG. 14 is a table illustrating a relationship among an MCS index, a modulation order, and a TBS index. FIG. 15 is a table illustrating a TBS based on a TBS index and the number of PRB pairs.

FIG. 14 is an MCS table for an MTC terminal when 3 bits are used as the number of signaling bits required for an MCS information transmission of DCI format M1A/M0A.

Referring to FIG. 14, QPSK is used when the MCS index $I_{MCS}$ ranges from 0 to 4, and 16QAM is used when the MCS index $I_{MCS}$ ranges from 5 to 7. Also, it is designed to use a value of $I_{TBS}=I_{MCS}*2$.

FIG. 15 illustrates a TBS value that an MTC terminal uses in the typical TBS table when the MCS table of FIG. 14 is used.

Third Embodiment

FIG. 16 and FIG. 17 are tables for describing a scheme of configuring downlink control information (DCI) that is transmitted to an MTC terminal in a normal coverage according to a third embodiment of the present disclosure. FIG. 16 is a table illustrating a relationship among an MCS index, a modulation order, and a TBS index. FIG. 17 is a table illustrating a TBS based on a TBS index and the number of PRB pairs.

FIG. 16 is an MCS table for an MTC terminal when 3 bits are used as the number of signaling bits required for an MCS information transmission of DCI format M1A/M0A. Therefore, QPSK is used when the MCS index $I_{MCS}$ ranges from 0 to 4, and 16QAM is used when the MCS index $I_{MCS}$ ranges from 5 to 7. Also, unlike the second embodiment, the MCS table in the third embodiment is designed to use a value of $I_{TBS}=I_{MCS}*2+1$.

FIG. 17 illustrates a TBS value that an MTC terminal uses in the typical TBS table when the MCS table of FIG. 16 is used.

According to the above described first embodiment, second embodiment, and third embodiment, i) information associated with the number of PRBs used for each subframe irrespective of the number of repetitively transmitted subframes and ii) an MCS index value proposed by the present disclosure may be used to determine a TBS value using scheduling information included in DCI format M1A/M0A.

Also, in the case in which a TBS value is determined using the scheduling information included in DCI format M1A/M0A, the TBS value may be changed to 1000 bits, and the changed TBS value may be used if the TBS value is greater than or equal to 1000 bits, which is the maximum TBS that may be transmitted to an MTC terminal.

Alternatively, in the case in which a TBS value is determined using the scheduling information included in DCI format M1A/M0A, the TBS value may be changed to be less than or equal to 1000 bits, and the changed TBS value may be used if the TBS value is greater than or equal to 1000 bits, which is the maximum TBS that may be transmitted to an MTC terminal. In this instance, the modulation method used may be changed to QPSK.

[Method of Configuring MCS for DCI Format M1B/M0B]

Fourth Embodiment

FIG. 18 to FIG. 21 are diagrams for describing a scheme of configuring downlink control information (DCI) that is transmitted to an MTC terminal in an extended coverage according to a fourth embodiment of the present invention. FIG. 18 is an MCS table for an MTC terminal when 4 bits are used as the number of signaling bits required for an MCS information transmission of DCI format M1B/M0B. It is designed to use QPSK with respect to all MCS indices. Also, it is designed that $I_{TBS}$ and $I_{MCS}$ have the same value.

$I_{TBS}$ in FIG. 18 indicates a TBS index in a TBS table that is newly designed for an MTC terminal, as opposed to the typical TBS table.

According to the fourth embodiment, to determine a TBS value using scheduling information used for DCI format M1B/M0B, only a TBS index based on an MCS index value proposed in the present disclosure is used, irrespective of information associated with the number of repetitively transmitted subframes and the number of PRBs used for each subframe.

FIG. 19 illustrates an example of a new TBS table for an MTC terminal for the fourth embodiments that uses 4 bits as the number of MCS signaling bits. In FIG. 19, a TBS table is designed to increase a padding overhead to be proportional to a TBS value by taking into consideration of a difference between the sizes of adjacent TBSs within 1000 bits as a padding overhead.

FIG. 20 illustrates a TBS table that is designed using a high frequent TBS value out of TBSs of FIG. 13 determined based on DCI format M1A/M0A, as another example of a new TBS table for an MTC terminal used in association with the fourth embodiment that uses 4 bits as the number of MCS signaling bits.

FIG. 21 illustrates a TBS of which a TBS value is used at least two times, and the number of times that the TBS value is used.

Fifth Embodiment

FIG. 22 to FIG. 27 are diagrams for describing a scheme of configuring downlink control information (DCI) that is transmitted to an MTC terminal in an extended coverage according to a fifth embodiment of the present disclosure.

FIG. 22 illustrates an MCS table for an MTC terminal when 3 bits are used as the number of signaling bits required for an MCS information transmission of DCI format M1B/M0B. It is designed that QPSK is used with respect to all MCS indices, and also, $I_{TBS}$ and $I_{MCS}$ are to have the same value.

$I_{TBS}$ in FIG. 22 indicates a TBS index in a TBS table that is newly designed for an MTC terminal, as opposed to the typical TBS table.

According to the fifth embodiment, to determine a TBS value using scheduling information used for DCI format M1B/M0B, only a TBS index based on an MCS index value proposed in the present disclosure is used, irrespective of information associated with the number of repetitively transmitted subframes and the number of PRBs used for each subframe.

FIG. 23 illustrates an example of a new TBS table for an MTC terminal used in the fifth embodiment that uses 3 bits as the number of MCS signaling bits.

A TBS table illustrated in FIG. 23 is designed to increase a padding overhead to be proportional to a TBS value by taking into consideration of a difference between the sizes of adjacent TBSs within 1000 bits as a padding overhead.

FIG. 24 illustrates a TBS table that is designed using a high frequent TBS value out of TBSs of FIG. 15 determined based on DCI format M1A/M0A, as another example of a new TBS table for an MTC terminal in association with the fifth embodiment that uses 3 bits as the number of MCS signaling bits.

FIG. 25 illustrates a TBS of which a TBS value of FIG. 15 is used at least two times, and the number of times that the TBS value is used.

FIG. 26 illustrates a TBS table that is designed using a high frequent TBS value out of TBSs of FIG. 17 determined based on DCI format M1A/M0A, as another example of a new TBS table for an MTC terminal in association with the fifth embodiment that uses 3 bits as the number of MCS signaling bits.

FIG. 27 illustrates a TBS of which a TBS value of FIG. 17 is used at least two times, and the number of times that the TBS value is used.

Sixth Embodiment

As another method of configuring an MCS table for DCI format M1B/M0B, DCI format M1B/M0b may equally use the MCS table of DCI format M1A/M0A proposed in the present disclosure based on the number of MCS signaling bits. In this instance, QPSK may be fixedly used as a modulation method, irrespective of an MCS index.

When information associated with the number of PRBs exists in scheduling information included in DCI format M1B/M0B, a TBS value may be determined in the same manner as the method of determining a TBS by using DCI format M1A/M0A, which is proposed in the present disclosure.

When the information associated with the number of PRBs does not exist in the scheduling information included in DCI format M1B/M0B, 6 PRBs corresponding to a single narrow band may be used for each subframe. In this instance, the TBS value may be determined by fixing a $N_{PRB}$ value to a predetermined value and by using a TBS index indicated by the typical TBS table and the MCS table.

Here, the $N_{PRB}$ value may be a predetermined value or signaling. For example, the $N_{PRB}$ value may be fixed to 3 or 4.

Figure 28:
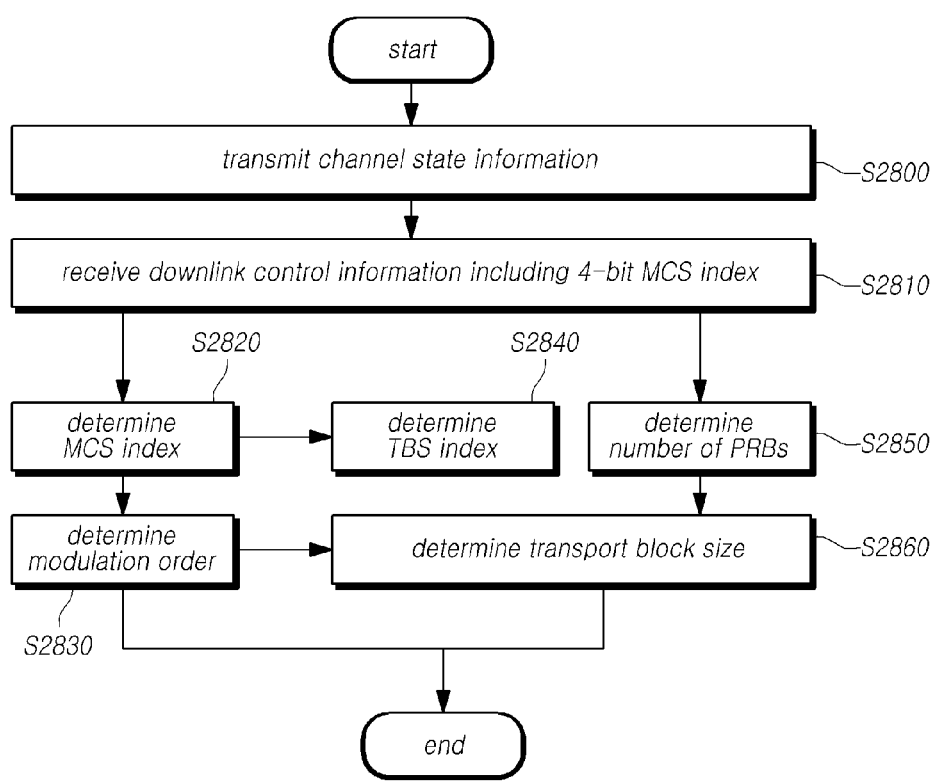
FIG. 28 is a diagram illustrating operations of a terminal according to the present disclosure.

FIG. 28 is a flowchart illustrating a method for an MTC terminal to receive downlink control information (DCI) from a base station and to determine a modulation method and a TBS used in a downlink data channel according to an embodiment of the present disclosure.

Referring to FIG. 28, a MTC terminal according to an embodiment of the present disclosure measures a channel state and transmits channel state information (CSI) including the measured channel state to a base station in operation S2800.

The MTC terminal receives, from the base station, downlink control information (DCI) including a 4-bit MCS index determined based on the CSI in operation S2810.

The MTC terminal determines the MCS index included in the CSI in operation S2820. The MTC terminal determines a modulation order indicated by the MCS index that is determined in an MCS table in which some or all of TBS indices are set to be the same as MCS indices in operation S2830.

In this instance, when the MTC terminal is an MTC terminal existing in a normal coverage, a modulation method based on the modulation order indicated by the determined MCS index may be QPSK or 16QAM. When the MTC terminal is an MTC terminal existing in an extended coverage, a modulation method based on the modulation order indicated by the determined MCS index may be an identical method, which is QPSK.

The MTC terminal determines a TBS index indicated by the MCS index included in the DCI in operation S2840. The MTC terminal determines the number of PRBs included in the DCI in operation S2850.

The MTC terminal determines a transport block size (TBS) used in a downlink data channel using a TBS index and the number of PRBs, which are determined from a TBS table including TBS indices and the number of PRBs, in operation S2860.

Figure 29:
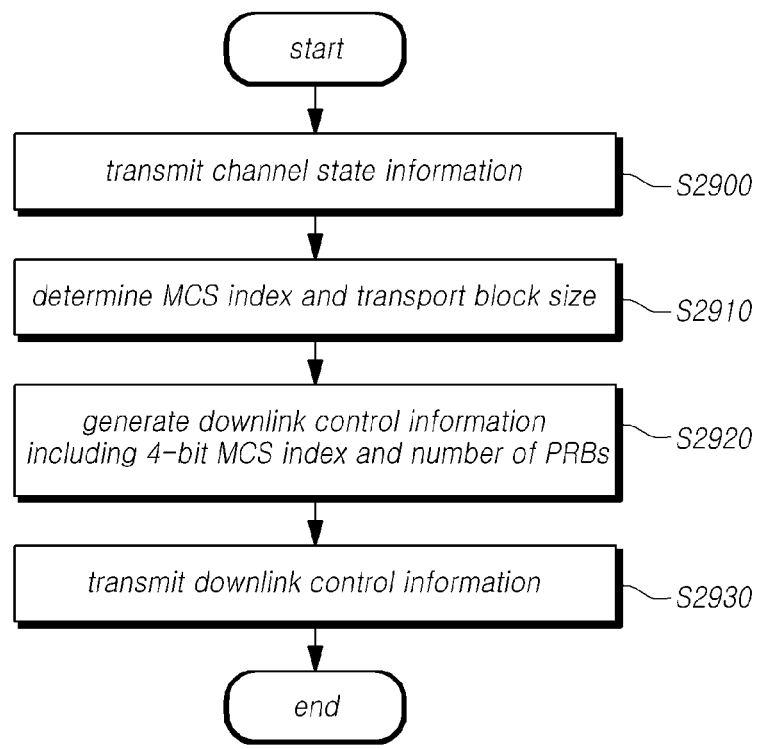
FIG. 29 is a diagram illustrating operations of a base station according to an embodiment of the present disclosure.

FIG. 29 is a flowchart illustrating a method for a base station to configure downlink control information (DCI) to be transmitted to an MTC Referring to FIG. 29, the base station according to an embodiment of the present disclosure, receives channel state information (CSI) from the MTC terminal in operation S2900.

The base station determines a transport block size (TBS) and an MCS to be used in a downlink data channel that is transmitted to the MTC terminal, based on the CSI in operation S2910.

The base station may select an MCS index from an MCS table in which some or all of the TBS indices are set to be the same as MCS indices. In this instance, a signaling bit required for an MCS information transmission is 3 bits or 4 bits.

When the MTC terminal is an MTC terminal existing in a normal coverage, a modulation order indicated by the MCS index in the MCS table may be QPSK or 16QAM.

For example, in a case in which a signaling bit required for an MCS information transmission is 4 bits, when an MCS index ranges from 0 to 9, QPSK is used as a modulation method. When an MCS index ranges from 10 to 15, 16QAM is used as a modulation method.

The base station determines the number of PRBs based on an MCS index and a TBS, which are determined from the TBS table including TBS indices, and generates downlink control information (DCI) including the determined MCS index and the number of PRBs in operation S2920.

The base station transmits, to the MTC terminal, the DCI including the MCS index formed of 4 bits and the number of PRBs in operation S2930 so that the MTC terminal determines a modulation method and a TBS used in the downlink data channel.

Figure 30:
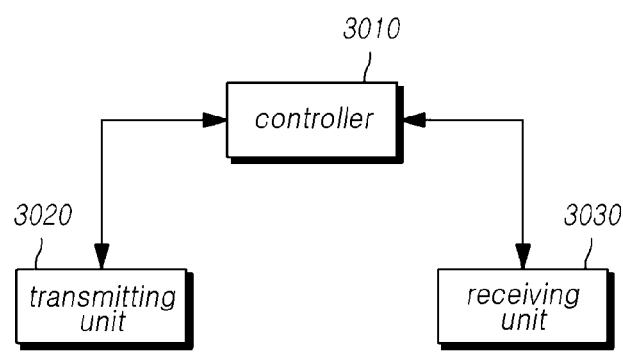
FIG. 30 is a diagram illustrating a configuration of a terminal according to the present disclosure.

FIG. 30 is a diagram illustrating a configuration of a terminal according to an embodiment of the present disclosure.

Referring to FIG. 30, a terminal 3000 according to an embodiment of the present disclosure includes a controller 3010, a transmitting unit 3020, and a receiving unit 3030.

The transmitting unit 3020 transmits, to the base station, uplink control information, data, and a message through a corresponding channel. Also, the transmitting unit 3020 transmits, to the base station, channel state information (CSI) including information obtained by measuring the quality of a channel.

The receiving unit 3030 may receive, from the base station, downlink control information (DCI), data, a message, through a corresponding channel. The DCI that is received from the base station may include information associated with an MCS index and the number of PRBs.

The controller 3010 determines a modulation method and a transport block size (TBS) used in a downlink data channel, based on the DCI received from the base station.

The controller 3010 i) determines an MCS index included in the DCI and ii) determines a modulation order indicated by an MCS index included in the DCI from an MCS table in which some or all of the TBS indices are set to be the same as MCS indices. A modulation method used in the downlink data channel is determined based on the determined modulation order. When the MTC terminal 3000 is an MTC terminal existing in a normal coverage, the modulation method used in the downlink data channel may be QPSK or 16QAM. When the MTC terminal 3000 is an MTC terminal existing in an extended coverage, the modulation method used in the downlink data channel may be QPSK.

From the MCS table, the controller 3010 determines a TBS index indicated by the MCS index included in the DCI and determines the number of PRBs included in the DCI. The controller 3010 determines a TBS value based on a TBS index and the number of PRBs from a TBS table and determines a TBS used in the downlink data channel.

Figure 31:
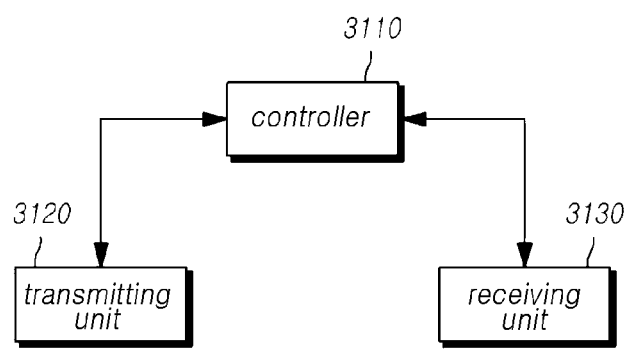
FIG. 31 is a diagram illustrating a configuration of a base station according to the present disclosure.

FIG. 31 illustrates a configuration of a base station according to an embodiment of the present disclosure.

Referring to FIG. 31, a base station 3100 according to an embodiment of the present disclosure includes a controller 3110, a transmitting unit 3120, and a receiving unit 3130.

The controller 3110 receives channel state information (CSI) from an MTC terminal and determines the size of a resource to be transmitted to the MTC terminal and an MCS based on the received CSI.

The controller 3110 determines an MCS index from an MCS table in which some or all of the TBS indices are set to be the same as MCS indices. The controller 3110 determines a TBS from a TBS table including TBS indices and the number of PRBs. The controller 3110 generates downlink control information (DCI) including the determined MCS index and the number of PRBs.

The transmitting unit 3120 and the receiving unit 3130 are used for transmitting/receiving, to/from the MTC terminal, a signal, a message, or data which is required to implement the present disclosure. The transmitting unit 3120 transmits, to the MTC terminal, DCI generated by the controller 3110 so that the MTC terminal determines, based on the DCI, a modulation order and a transport block size (TBS) that are used in a downlink data channel.

The content associated with the standard or standard documents, mentioned in the above described embodiments, has been omitted for simple description of the present specifications, but it may be a part of the present specifications. Therefore, when a part of the content and documents associated with the standard is added to the present specifications or is specified in claims, it should be construed as a part of the present invention.

Although the exemplary embodiments of the present disclosure have been described for illustrative purposes, those skilled in the art will appreciate that various modifications and substitutions are possible, without departing from the scope and spirit of the present disclosure as disclosed in the accompanying claims. Therefore, the exemplary embodiments disclosed in the present disclosure are intended to illustrate the scope of the technical idea of the present disclosure, and the scope of the present disclosure is not limited by the exemplary embodiments.

What is claimed is:

1. A method of determining, by a user equipment (UE), a modulation order and a transport block size (TBS) in a downlink data channel, the method comprising:
    receiving, from a base station, downlink control information;
        determining the modulation order used in the downlink data channel using i) a modulation and coding scheme (MCS) table including at least one of TBS indices set to be identical to MCS indices and ii) an MCS index included in the downlink control information; and
        determining a TBS index using the MCS table and the MCS index included in the downlink control information, and determining a TBS in the downlink data channel using a TBS table including TBS indices, the determined TBS index and the number of physical resource blocks (PRBs) included in the downlink control information,
    wherein, when a number of repetitive transmissions of the downlink data channel is less than or equal to a predetermined number of times, a modulation order indicated by the MCS index included in the downlink control information is one of QPSK and 16QAM;
    wherein, when the number of repetitive transmissions of the downlink data channel exceeds a predetermined number of times, a modulation order indicated by the MCS index included in the downlink control information is identical, each of all TBS indices mapped from the MCS indices in the MCS table is set to have a value identical to a corresponding MCS index, and
    wherein the number of repetitive transmissions of the downlink data channel is identified according to a format of the downlink control information determined based on a coverage level of the UE.

2. The method of claim 1, wherein: in the MCS table,
    (i) a range of the MCS indices is from 0 to 15;
    (ii) a range of the TBS indices is from 0 to 15; and
    iii) each of all TBS indices mapped from the MCS indices in the MCS table is set to have a value identical to a corresponding MCS index.

3. The method of claim 1, wherein, when a TBS index indicated by the MCS index included in the downlink control information is identical to the MCS index, a modulation order indicated by the MCS index included in the downlink control information is QPSK.

4. The method of claim 1, wherein a modulation order indicated by the MCS index included in the downlink control information is QPSK.

5. A method of determining, by a base station, a modulation order and a transport block size (TBS) in a downlink data channel, the method comprising:
    receiving channel state information from a user equipment (UE);
    determining a modulation and coding scheme (MCS) index and a number of physical resource blocks (PRBs) based on i) an MCS table having at least one of TBS indices set to be identical to MCS indices, ii) a TBS table including TBS indices, and iii) the channel state information; and
    transmitting, to the UE, downlink control information including the determined MCS index and the number of PRBs,
    wherein, when a number of repetitive transmissions of the downlink data channel is less than or equal to a predetermined number of times, a modulation order indicated by the MCS index included in the downlink control information is one of QPSK and 16QAM;
    wherein, when the number of repetitive transmissions of the downlink data channel exceeds a predetermined number of times, a modulation order indicated by the MCS index included in the downlink control information is identical, each of all TBS indices mapped from the MCS indices in the MCS table is set to have a value identical to a corresponding MCS index, and
    wherein the number of repetitive transmissions of the downlink data channel is identified according to a format of the downlink control information determined based on a coverage level of the UE.

6. The method of claim 5, wherein: in the MCS table,
    (i) a range of the MCS indices is from 0 to 15;
    (ii) a range of the TBS indices is from 0 to 15; and
    iii) each of all TBS indices mapped from the MCS indices in the MCS table is set to have a value identical to a corresponding MCS index.

7. The method of claim 5, wherein, when a TBS index indicated by the determined MCS index in the MCS table is set to be identical to the determined MCS index, a modulation order indicated by the determined MCS index is QPSK.

8. The method of claim 5, wherein a modulation order indicated by the determined MCS index is QPSK.

9. A user equipment (UE), comprising:
- a transmitter configured to transmit channel state information to a base station;
- a receiver configured to receive downlink control information from the base station; and
- a controller comprising at least one hardware processor configured to: determine a modulation order used in a downlink data channel based on i) a modulation and coding scheme (MCS) table having at least one of TBS indices set to be identical to MCS indices and ii) an MCS index included in the downlink control information; and determine a transport block size (TBS) in the downlink data channel based on a TBS table including TBS indices, a TBS index indicated by the MCS index included in the downlink control information and the number of physical resource blocks (PRBs) included in the downlink control information,
- wherein, when a number of repetitive transmissions of the downlink data channel is less than or equal to a predetermined number of times, a modulation order indicated by the MCS index included in the downlink control information is one of QPSK and 16QAM;
- wherein, when the number of repetitive transmissions of the downlink data channel exceeds a predetermined number of times, a modulation order indicated by the MCS index included in the downlink control information is identical, each of all TBS indices mapped from the MCS indices in the MCS table is set to have a value identical to a corresponding MCS index, and
- wherein the number of repetitive transmissions of the downlink data channel is identified according to a format of the downlink control information determined based on a coverage level of the UE.

10. The UE of claim 9, wherein: in the MCS table,
(i) a range of the MCS indices is from 0 to 15;
(ii) a range of the TBS indices is from 0 to 15; and
(iii) each of all TBS indices mapped from the MCS indices in the MCS table is set to have a value identical to a corresponding MCS index.

11. The UE of claim 9, wherein, when a TBS index indicated by the MCS index included in the downlink control information in the MCS table is identical to the MCS index, a modulation order indicated by the MCS index is QPSK.

12. The UE of claim 9, wherein a modulation order indicated by the MCS index included in the downlink control information is QPSK.

* * * * *